Patented Nov. 4, 1941

2,261,148

UNITED STATES PATENT OFFICE 2,261,148

METHOD OF TREATING FIBROUS GLASS

Paul Ebaugh, Granville, Ohio, assignor, by mesne assignments, to Owens-Corning Fiberglas Corporation, a corporation of Delaware No Drawing. Application April 10, 1937, Serial No. 136,234

3 Claims. (Cl. 49—77)

The present invention relates to treatment of fibrous glass, and more particularly to a method for improving its qualities such as softness, feel, pliability, flexibility, strength, resistance to abrasion, texture, and reduction of brashiness.

It is an object of the invention to provide a method of treating fibrous glass, particularly when in mat, sliver, cloth, yarn, thread, cable, fabric or other form, in order to improve the above mentioned physical properties.

Another object of the invention is to provide a method for reducing the diameter size of the fibers to less than the diameter or the fabricated fibers or filaments.

Another object of the invention is to provide a method of treating fibrous glass in order to thoroughly clean the surface of the fibers, rendering it more receptive to a lubricating medium, whereby mutual scratching and fracturing of the fibers may be more perfectly inhibited.

Another object of the invention is to smooth out any cracks, fissures, projections, or other points of stress concentration in order to increase the strength of the glass fibers and reduce the possibility of fracture at these points.

Another object of the invention is to provide a method of treating interwoven glass cloths or yarns in order to remove fuzzy, loose or upstanding ends and the like without impairing the fibers within the yarns or cloth.

Broadly stated, my invention contemplates treating fibrous glass with a suitable substance capable of etching the same, or reacting with the surface thereof, or with certain of the ingredients therein, whereby the surface may be cleaned, smoothed off, or partially eaten away to a predetermined degree, according to the degree of treatment and the concentration of the solution used in treating the fibrous glass.

As examples of some of the substances which may be used to treat the fibrous glass, there may be mentioned basic substances such as alkali bases, and more particularly potassium hydroxide or sodium hydroxide solution, or various acids such as hydrofluoric acid, in liquid or fume form, fluoride salts, pastes, etc. having a dissolving effect upon the glass. When using the hydrofluoric acid substances, however, I preferably use a very dilute solution and for a relatively short period of time owing to the tremendous surface area exposed to the solution by the fibrous glass and the great strength of the acid.

In practicing the invention, however, I preferably use an alkali hydroxide such as potassium or sodium hydroxide, to which the fibrous glass may be subjected for varying periods of time according to the results desired.

The effect of these solutions upon the glass also depends to a certain extent upon the composition of the glass, and more particularly upon the alkali content thereof, which is more directly affected by the alkali hydroxide solution. Thus glasses having greater percentages of alkali ingredients require less time of reaction or less concentration of alkali in order to produce the same effect as obtained with glasses having less alkali ingredients.

After the fibrous glass has been treated with the alkali solution for the desired period of time, it is preferably thoroughly washed to eliminate the alkali; and this may be done more effectively by washing the fibrous glass in a dilute acid solution such as dilute hydrochloric acid, nitric acid, sulphuric acid or other acids. When the alkali has been thoroughly washed from the surface of the fibrous glass, it is desirable to relubricate the fibers with a suitable protective coating or lubricant such as mineral or vegetable oil, sulphonated castor oil, wax, tricresyl phosphate, resin or other oleaginous or plastic substances.

This relubrication may be most easily accomplished simultaneously with the neutralization of the alkali; and this may be done by incorporating the relubricating substance directly into the dilute acid solution. Thus, for example, the fibrous glass may be washed and treated with a dilute solution of hydrochloric acid having a small admixture, as, for example, 2% of sulphonated oil or other lubricating substance therein. As a result, the fabrics emerge from this treatment in a soft, flexible, strong, nonirritating state and have properties highly superior to the fibrous glass before the treatment.

As specific examples of my treatment, it is possible to boil a fabricated fibrous glass article in a solution of sodium or potassium hydroxide which may have a concentration of, for example, one-half normal. After boiling this material for a suitable period of time, for example, fifteen minutes, the fabricated article may be neutralized with a dilute hydrochloric acid solution having a 2% admixture of sulphonated castor oil or other lubricant. Fabrics treated in this manner are found to be stronger under pop tests, tension tests and abrasion tests than the same fabrics before treatment. Moreover, fabrics which were so coarse as to be brash before the test were much softer and substantially free from brashiness after the test.

It is also possible to treat the fabricated articles of fibrous glass for longer periods of time and at higher concentrations of the alkali hydroxide. This treatment when carried far enough may actually materially reduce the fiber diameter of the fibrous glass to such an extent that the glass fibers are extremely flexible, soft, and nonirritating.

As an example of this treatment, it is possible to prepare a 30% to 40% solution of alkali hydroxide, preferably potassium hydroxide, owing to its more gentle action upon the glass, and then treat the fibrous glass in this solution for a period of about a week, depending upon the original fiber diameter of the glass, its composition, and the strength of the solution. If higher temperatures are used, this period may be reduced. Thus, as a result, if the original fiber diameter of the glass fabric is in the range of about .0003 to .00035 inch, the fiber diameter at the end of this period of time may be in the neighborhood of about .00015 to .0002 inch, these figures being more or less approximate according to the exact conditions involved. At the end of the treatment with the alkali hydroxide, the fabrics should be rinsed in an aqueous bath to wash off the alkali. This bath may contain a small amount of sulphonated olive oil or other oleaginous substance serving to lubricate the individual fibers in the fabric. The wash water may also contain, and preferably does, a dilute acid solution such as hydrochloric acid serving to more completely eliminate and neutralize residual alkali. It may also contain a fatty acid or an ammonium salt or both which tend to maintain acid conditions on the fibers.

The fabrics emerging from this treatment are much finer, softer, more delicate, and lighter than before the treatment. They are completely free from brashiness and may be compared with angora in softness. Moreover, I have found that when these fabrics are tested for strength and resistance to repeated fracture or abrasion, the fabrics stand up remarkably well, and have strengths considerably higher than fabrics having a comparable amount of glass therein but which have not been so treated. If an interwoven cloth is treated in this manner, a large portion of the glass is actually removed, and the weave becomes more open in texture and the material is more flexible, pliable and softer. The same treatment, however, may be applied to the yarn prior to weaving, which permits a fabric to be subsequently interwoven which is as hard and closely woven as desired. The quality of the individual fibers, with regard to flexibility and softness, however, will be retained.

As an example of treating fibrous glass with hydrofluoric acid, it is possible to take a 10% solution and treat the glass fibers therewith for a short time, such as a minute and a half to two minutes. A very short treatment will not have an appreciable effect on the fibers unless they are extremely fine.

If a fabricated cloth is treated for, say, three minutes in a 20% solution of hydrofluoric acid, the weave will be noticeably opened. Also, the loose ends or fuzz will be dissolved off, leaving, however, the twisted fibers within the yarns little affected. Under a six minute treatment of 20% acid solution, the weave of the fabric will be materially opened, and the fabric rendered soft, flexible and pliable. Fabrics treated in accordance with the present invention may be used to advantage in many situations, such as draperies, theatre curtains, awnings, clothing, and other fabrics which are handled a good deal.

Modifications and variations may be resorted to within the spirit and scope of the present invention.

I claim:

1. The method of treating fabricated textile material composed of yarns of a multiplicity of fine glass fibers in substantial parallelism and closely held together in said textile material, which comprises subjecting the fibers of the material throughout said yarns to hydrofluoric acid and thereby causing portions of said glass fibers to be dissolved by said acid, and then removing said acid to increase the flexibility and softness of said material.

2. The method of treating fabricated textile material composed of interwoven yarns of a multiplicity of fine glass fibers in substantial parallelism and closely held together in said textile material, which comprises dissolving portions of the surface of said individual glass fibers with hydrofluoric acid, washing the fibers, and applying a lubricating medium to the surface of said fibers.

3. The method of treating fabricated textile yarns composed of a multiplicity of fine glass fibers in substantial parallelism and closely held together in said textile yarns, which comprises subjecting the fibers throughout said yarns to hydrofluoric acid and thereby causing portions of said glass fibers to be dissolved by said acid, and then removing said acid to increase the flexibility and softness of said yarns.

PAUL EBAUGH.